US012760592B2

(12) United States Patent
Güell Pinilla et al.

(10) Patent No.: US 12,760,592 B2
(45) Date of Patent: Oct. 13, 2026

(54) SHUTTER SYSTEMS

(71) Applicant: BIRKIGT, S.L., Parets del Vallès (ES)

(72) Inventors: David Güell Pinilla, Barcelona (ES); Santiago Azor Alonso, Sant Just Desvern (ES)

(73) Assignee: BIRKIGT, S.L., Parets del Vallès (ES)

( * ) Notice: Subject to any disclaimer, the term of this patent is extended or adjusted under 35 U.S.C. 154(b) by 362 days.

(21) Appl. No.: 18/282,528

(22) PCT Filed: Mar. 17, 2022

(86) PCT No.: PCT/EP2022/056928
§ 371 (c)(1),
(2) Date: Sep. 16, 2023

(87) PCT Pub. No.: WO2022/194986
PCT Pub. Date: Sep. 22, 2022

(65) Prior Publication Data
US 2024/0141722 A1 May 2, 2024

(30) Foreign Application Priority Data
Mar. 17, 2021 (EP) .................................... 21382209

(51) Int. Cl.
*E06B 9/06* (2006.01)

(52) U.S. Cl.
CPC .......... *E06B 9/0638* (2013.01); *E06B 9/0669* (2013.01); *E05Y 2800/298* (2013.01)

(58) Field of Classification Search
CPC . E05D 15/06; E05D 15/0604; E05D 15/0605; E05D 15/26; E05D 15/264;
(Continued)

(56) References Cited

U.S. PATENT DOCUMENTS 33,830 A * 12/1861 Dodge ...................... E05D 3/12 16/366
110,659 A * 1/1871 Jenness ..................... E05D 3/12 16/366
(Continued)

FOREIGN PATENT DOCUMENTS

CN 202483312 U 10/2012
JP 2003096903 A 4/2003
WO WO2004048734 A1 6/2004

OTHER PUBLICATIONS

PCT/EP2022/056928 International Search Report, Search Strategy and Written Opinion (total 13 pages); European Patent Office, Rijswijk NL, May 13, 2022.

*Primary Examiner* — Johnnie A. Shablack
(74) *Attorney, Agent, or Firm* — Peter B Scull

(57) ABSTRACT

A folding shutter system is provided including a first leaf to be hingedly connected to a building structure, the first leaf being hingedly connected to a second leaf; a driving hinge mechanism having a tubular body longitudinally arranged between the two leaves, the two leaves being rotatably displaceable relative to each other about a longitudinal axis of the tubular body, defining at least a folded position and an expanded position of the leaves; the leaves having a cross-sectional outline having a beveled edge, the beveled edges being arranged to define a cavity for housing at least partially the cross-sectional outline of the tubular body.

19 Claims, 10 Drawing Sheets

(58) Field of Classification Search
CPC ....... E05D 15/266; E05D 15/02; E05D 15/08; E05D 15/12; E05F 15/605; E05B 63/122; E06B 3/48; E06B 3/481; E06B 3/487; E06B 3/50; E06B 3/5072
See application file for complete search history.

(56) References Cited

U.S. PATENT DOCUMENTS 217,054 A * 7/1879 Buckman .................. E05D 3/12 16/283
657,982 A * 9/1900 Gerwien ................ D05B 81/00 16/282
845,418 A * 2/1907 Johnson ................ E05D 15/266 160/206
1,272,864 A * 7/1918 Schoening et al. ... E05D 15/266 160/206
1,318,433 A * 10/1919 Berardinelli .......... E05D 15/266 160/206
1,672,418 A * 6/1928 Lehman .................... E05D 3/12 312/329
1,841,898 A * 1/1932 Lehman .................... E05D 3/08 16/366
2,644,553 A * 7/1953 Cushman ................ E04C 2/365 114/201 R
2,703,140 A * 3/1955 Bonawit ................. E06B 3/481 16/93 R
3,359,594 A * 12/1967 Beno ....................... E06B 3/481 160/199
3,405,756 A * 10/1968 Harris ..................... E06B 3/481 160/183
3,491,483 A * 1/1970 Miller ................. E05D 15/0604 49/141
3,640,333 A * 2/1972 Leclerc ................... E06B 3/481 160/183
3,646,636 A * 3/1972 Hives ........................ E05D 3/02 16/332
4,434,525 A * 3/1984 Labelle ..................... E05D 1/04 16/374
4,441,376 A * 4/1984 Tobey ................... E05F 15/605 74/105
4,534,395 A * 8/1985 Carroll .................. E05F 15/605 160/199
4,620,581 A * 11/1986 Wallace .................... E06B 9/02 160/187
4,644,725 A * 2/1987 Schijf ..................... E06B 3/486 52/465
4,660,613 A * 4/1987 Dagenais ................ E05D 15/26 160/183
4,922,987 A * 5/1990 Marontate ............... E06B 3/481 160/183
4,924,932 A * 5/1990 Esnault ................. E05D 15/165 160/235
5,097,883 A * 3/1992 Robinson .............. E06B 9/0638 160/183
5,150,501 A * 9/1992 Pasternak ............... E05D 15/26 16/272
5,199,478 A * 4/1993 Kubota ................... E06B 3/481 160/40
5,782,282 A * 7/1998 Chen ....................... E06B 7/362 160/40
5,842,508 A * 12/1998 Krupke ................... E05D 15/24 16/261
5,915,446 A * 6/1999 De Zen ................... E06B 3/485 16/269
6,129,132 A * 10/2000 Denoual ................... E05D 1/04 160/235
6,470,952 B1 * 10/2002 Cline .................... E05D 15/266 160/199
6,722,415 B2 * 4/2004 Mochizuki .............. E06B 9/115 160/235
8,496,042 B1 * 7/2013 Motosko ............... E06B 9/0638 160/187
9,309,696 B2 * 4/2016 Friese ................... E05B 65/087
9,428,259 B2 * 8/2016 Savian ...................... E05D 1/02
9,879,471 B2 * 1/2018 Lewis ........................ E05D 3/02
9,994,320 B2 * 6/2018 Long ..................... E06B 3/4636
10,471,814 B1 * 11/2019 Weng ........................ B60P 7/02
10,557,297 B2 * 2/2020 Stenhouse ............... E05D 15/26
10,815,710 B2 * 10/2020 Svenson ............... E06B 9/0669
11,326,392 B2 * 5/2022 Tostee ....................... E06B 7/09
11,486,177 B2 * 11/2022 Mitchell ................. E05D 15/56
2008/0202706 A1 * 8/2008 Fath ........................ E05D 15/26 160/199
2009/0152879 A1 * 6/2009 Pala ........................ E05C 9/048 312/319.1
2010/0270814 A1 * 10/2010 Labarre ............... E05B 47/0012 292/144
2015/0330126 A1 * 11/2015 Ma ........................ E05B 47/004 292/32
2023/0083772 A1 * 3/2023 Chadwell .............. E05F 15/605 244/206
2024/0141722 A1 * 5/2024 Güell Pinilla ........ E06B 9/0669

* cited by examiner

Fig. 6
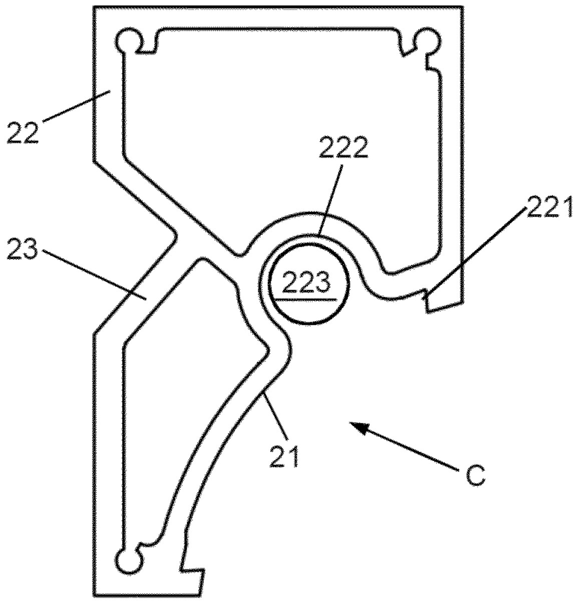
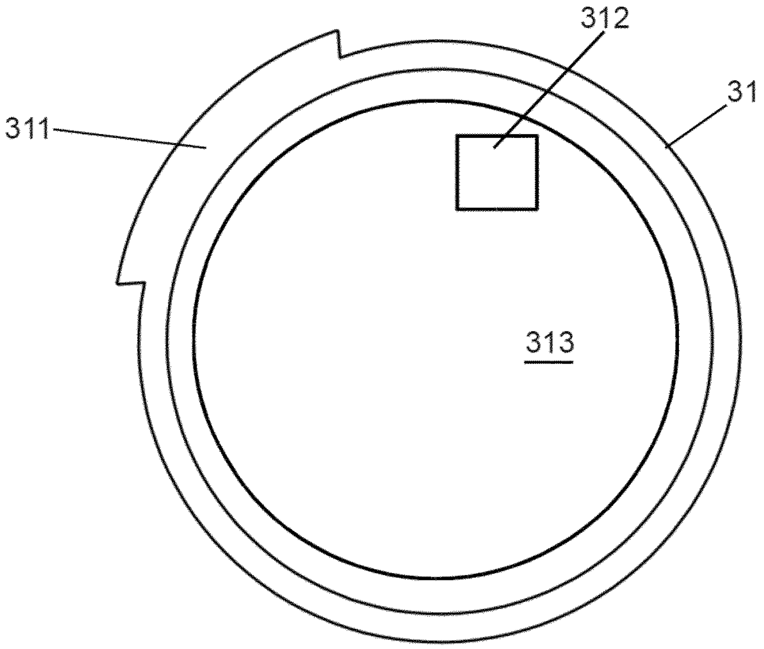
Fig. 7

SHUTTER SYSTEMS

The present disclosure relates to shutter systems. Particularly, the present disclosure relates to folding shutter systems.

BACKGROUND

Shutters may be used in buildings and the like as a screen or shield on windows, doors, parts of the facade such as stained-glass windows, bay windows, window faces, or even roofs. Shutters may offer the user privacy, security and/or protection against sunlight and weather.

Shutters have leaves or sheets hinged to each other. The leaves or sheets may be operated manually or by electric actuators from an open or folded position to a closed or expanded position. In the folded position the leaves may form a zigzag seen from above. In manually actuated shutters, they are usually relatively small-sized shutters since the user cannot operate relatively large-sized shutters, for example those shutters intended to be used on large areas of a building facade.

When electric actuators are used, they include usually complex and bulky mechanisms. This type of shutters, e.g. sliding shutters, may require the installation of several electric motors in the building, linking elements between the motors and the leaves and guiding elements for guiding the leaves. In some cases, the linking elements and guiding elements are based on complex sliding mechanisms, e.g carriers, roles, etc. The latter may mean a bulky and cumbersome solution. Therefore, these solutions may involve a negative appearance, particularly a negative overall appearance of the building. In addition, the installation of the system may be complex and time-consuming.

Furthermore, in case of failure of the shutters with electric actuators, their operation may be prevented, with the corresponding inconvenience to the users.

Therefore, there is a need for further improvements in shutters. The present disclosure provides systems related to shutters that avoid or at least reduce drawbacks of the prior solutions.

SUMMARY

In a first aspect, a folding shutter system is provided. The system includes: a first leaf to be hingedly connected to a building structure, the first leaf being hingedly connected to a second leaf; a driving hinge mechanism including a tubular body longitudinally arranged between the two leaves, the two leaves being rotatably displaceable relative to each other about a longitudinal axis of the tubular body, such that at least a folded position and an expanded position of the leaves are defined; the leaves having a cross-sectional outline having a beveled edge, the beveled edges being arranged to define a cavity for housing at least partially the cross-sectional outline of the tubular body.

A folded position may mean an open position of the shutter. In a folded position the leaves may be positioned substantially perpendicular to the façade of the building. An extended position may mean a closed position of the shutter. In an extended position the leaves may be arranged substantially parallel to the façade of the building.

The shutter system may be foldable by virtue of the driving hinge mechanism disposed between the leaves. The driving hinge mechanism may be attached to the leaf along the length of the leaf, i.e. attached to the longitudinal side of the leaf. The driving hinge mechanism may apply a folding or unfolding torque to the leaves, i.e. a force applied following an angular direction or the opposite one about the longitudinal axis of the tubular body.

The cavity may be defined for housing or receiving at least partially a side face of the tubular body.

The shutter system of the first aspect may minimize the visual impact of its components on the building. The cavity formed by the two leaves may allow to receive in its interior, at least partially, the tubular body. The tubular body may be at least partially concealed by the two leaves in the extended position. The tubular body may be made to go unnoticed when the leaves are extended. The visual appearance of the building, i.e. looking at the façade, may be improved. The space or clearance between two leaves in the extended position may be minimized. Therefore privacy, security and/or protection against sunlight and weather may be improved with the shutter system. Due to the simplicity of the shutter configuration, the time required for installation and maintenance may be reduced.

When the shutter system is in its folded position, the leaves may be arranged in parallel, i.e. with the main faces facing each other. In that case, the driving hinge mechanism may also be housed, at least partially, in the cavity. This may allow that the leaves may be closer together. Thus, a significantly compact assembly can be achieved, and the occupied space may be optimized.

The cavity may be defined along a portion of the length of the leaf. The cavity may be configured, e.g. sized, to receive the cross-sectional outline of the tubular body in such a way that the cross-section outline of the tubular body does not protrude from a face of the leaf, the face to be in front of or opposite to the façade of the building.

Since the tubular body may be at least partially housed inside the cavity, the thickness of the system as seen in plan view (seen from above) may be minimized and thus the space occupied may be minimized. The latter may be achieved in the extended and/or the folded position of the shutter system. A gap defined between first and second leaves may be minimized according to the first aspect in a folded and extended position.

The actuating module may have a single built-in electric motor inside. Number of electric motors may vary depending on the application. Two or more electric motors may be arranged inside the tubular body to produce more torque. If there are two or more electric motors, the operation of the electric motors may be synchronized. Synchronization may enable adjusting operation of each motor inside the driving hinge mechanism in order to transmit a predetermined overall torque through a common shaft, e.g. an electrical shaft.

In some examples, the beveled edge and the cross-sectional outline of the tubular body may have cooperating shapes with each other. This may allow to removably attach the tubular body, or at least a portion thereof, to a leaf.

The outline of the tubular body in cross section may have a shape closely matching the shape of the cross section of the bevelled edge. This may allow to more accurately receive the tubular body, the tubular body may match the shape of the cavity. This may allow to further conceal the tubular body and thus may further reduce the visual impact thereof.

In examples, the tubular body may be generally cylindrically shaped. All the modules or portions of the tubular body may be configured to keep the generally cylindrical shape.

According to some examples of the system, the tubular body may include an actuating module operatively connected to a transmission module, the actuating module and the transmission module may be rotatably displaceable relative to each other about the longitudinal axis, and each of the actuating module and the transmission module may be respectively joined to the first and second leaves.

The actuating module may generate a relative rotary motion between the two leaves and about the longitudinal axis of the tubular body. The transmission module may transmit motion to one of the leaves with respect to the actuating module. One of the leaves may be attached to the actuating module and the other leaf may be attached to the transmission module.

In examples, the actuating module may be disposed at one end of the tubular body. In some examples of the system, the actuating module may be detachably connected to a leaf. The actuating module may be easily removed with respect to the rest of the tubular body by being arranged at one end.

According to an example of the system, the tubular body may have a locking module to lock the leaves with respect to the building structure in the expanded position. The locking module may have a protruding element to collaborate with a corresponding member of the building structure. The protruding element, such as a pin, may be actuated following a back-and-forth direction along the longitudinal axis of the tubular body. A locking module arranged in the driving hinge mechanism may make it possible to reduce the visibility of the auxiliary elements such as a locking device of the shutter system. In examples, a protruding part of the locking module, e.g. a pin, may be configured to be inserted into an orifice or the like associated with the building. In some examples, the protruding part of the locking module may interact with a guiding member such as a guiding rail linked to the building, such that the part of the locking module may act as an anchor. In this way, the two leaves may be prevented from moving relative to each other. The locking module may be removed from the rest of the tubular body, for instance when the locking module is disposed at one at one end of the tubular body opposite to the actuating module.

The built-in motor may be a reversible gear motor, i.e. a relative movement of the leaves about the longitudinal axis may be allowed even if the motor is not actuated. For instance, the leaves may be rotatably displaced in an angular direction or a counter-direction about the longitudinal axis. This may be the case for a manual actuation on the leaves for extending or folding the leaves. The locking module may have an unlocking lever or the like to manually displace the protruding part. This way, the modules of the tubular body may be freely rotatable relative to each other and the shutter system according to the present disclosure may be manually actuated.

The tubular body may still act as a hinge between the two leaves if the actuating module and/or the locking module are removed. The tubular body may have the transmission module attached to one leaf and a central portion of the tubular body may be attached to the other leaf. The central portion and the transmission module may be rotatable relative to each other about the longitudinal axis. Thus, even if the actuating module and/or the locking module are removed, the shutter may be opened and/or closed.

In examples, the cavity may be arranged to face the building structure in the expanded position. This may help to minimize a negative visual impact of auxiliary elements of the shutter system except for the leaves.

The shutter system may be actuated, i.e. to become folded or unfolded, following an horizontal direction or a vertical direction.

According to a further aspect, a method of operation of the shutter system according to any of herein disclosed examples, is disclosed. The method includes activating the driving hinge mechanism under predefined parameters, the parameters may be at least one of: angular speed, duration, angular direction and/or angular span. The angular direction may be defined about the longitudinal axis. The angular span may refer to an angular displacement of a leaf with respect to the longitudinal axis.

In some examples of the method, the shutter system may have various driving hinge mechanisms, and the driving hinge mechanisms may be activated in a predefined order. One or more hinge mechanisms may be actuated before the rest.

In some examples of the method, the shutter system may have various driving hinge mechanisms, and the parameters for activating at least two driving hinge mechanisms are different from each other. For instance, a shorter or longer duration, a higher or lower speed, a wider or narrower angular span or the like among the leaves. This way, the driving hinge mechanisms may be operated not uniformly.

Throughout the present disclosure, expressions such as above, below, beneath, under, upper, top, bottom, lower, side, etc are to be understood taking into account the arrangement of a shutter system or the like in an operating condition as a reference.

Throughout the present disclosure, expressions such as shutter or shutter system are interchangeably used.

Throughout the present disclosure, expressions such as building structure, structure or building are interchangeably used.

Throughout the present disclosure, expressions such as outline or contours are interchangeably used.

BRIEF DESCRIPTION OF THE DRAWINGS

Non-limiting examples of the present disclosure will be described in the following, with reference to the appended drawings, in which:

FIG. 6 schematically illustrates a plan view of an extruded profile of a leaf of a folding shutter system according to an example;

FIG. 7 schematically illustrates a plan view of a tubular body of a driving hinge mechanism of a folding shutter system according to an example;

DETAILED DESCRIPTION OF EXAMPLES

In these figures, the same reference signs have been used to designate matching elements. Some parts have not been illustrated for the sake of clarity. In the attached figures some non-visible elements have been represented with dashed lines for the sake of clarity.

The present detailed description is related to a folding shutter system 1 applied to a window 101 by way of non-limiting example. The window 101 may belong to a building 100 such as a house, office building or the like.

Figure 1:
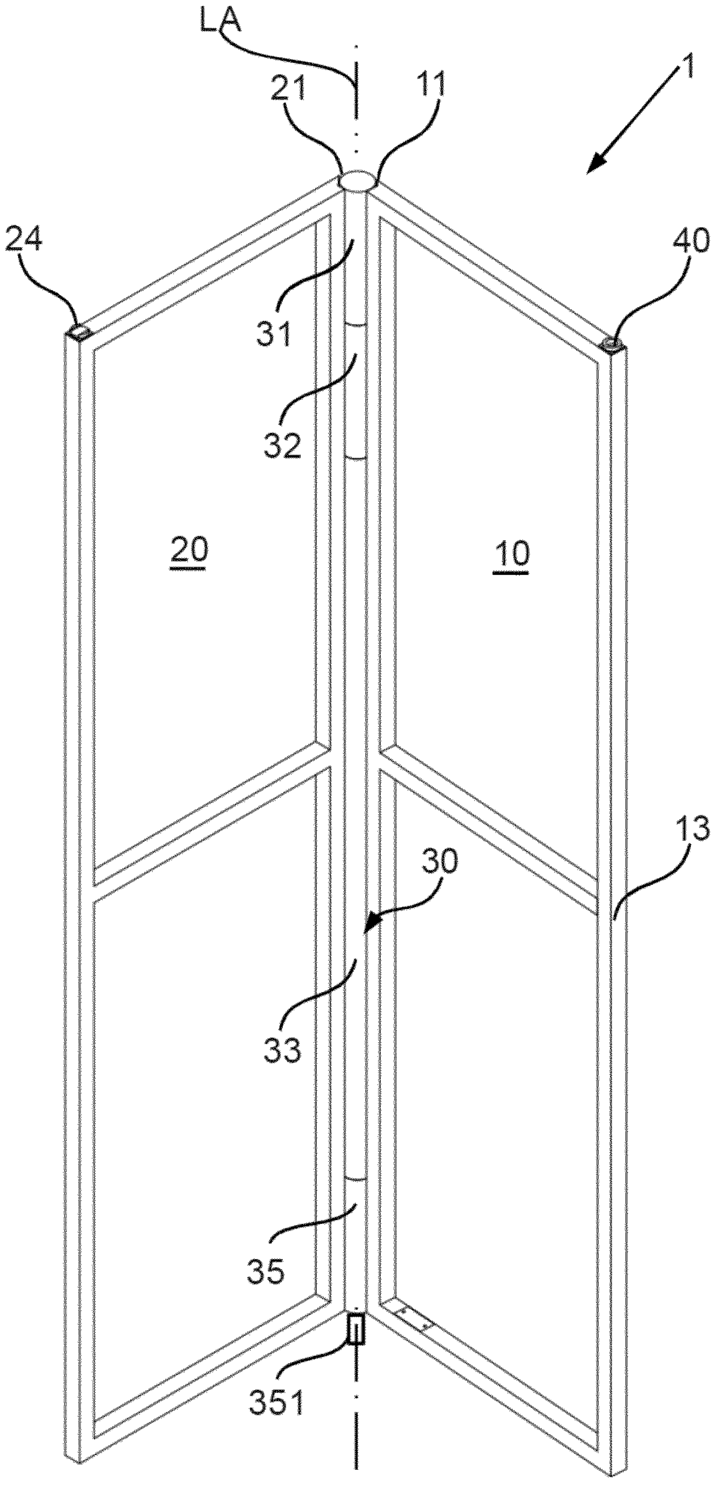
FIG. 1 schematically illustrates a perspective view of a folding shutter system according to an example of the present disclosure.
Figure 3:
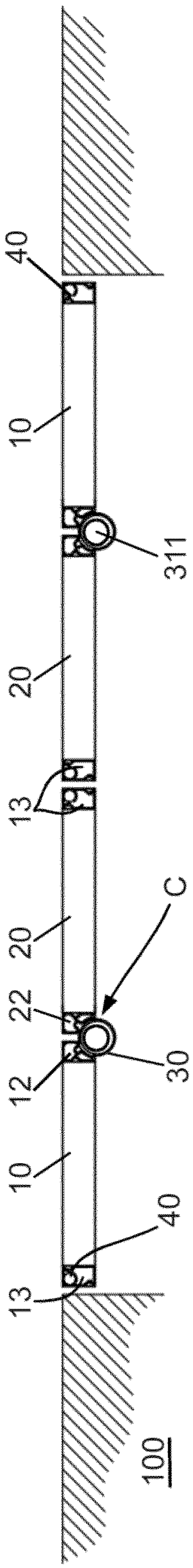
FIG. 3 schematically illustrates a plan view of the folding shutter system of FIG. 2 in an extended position.
Figure 8:
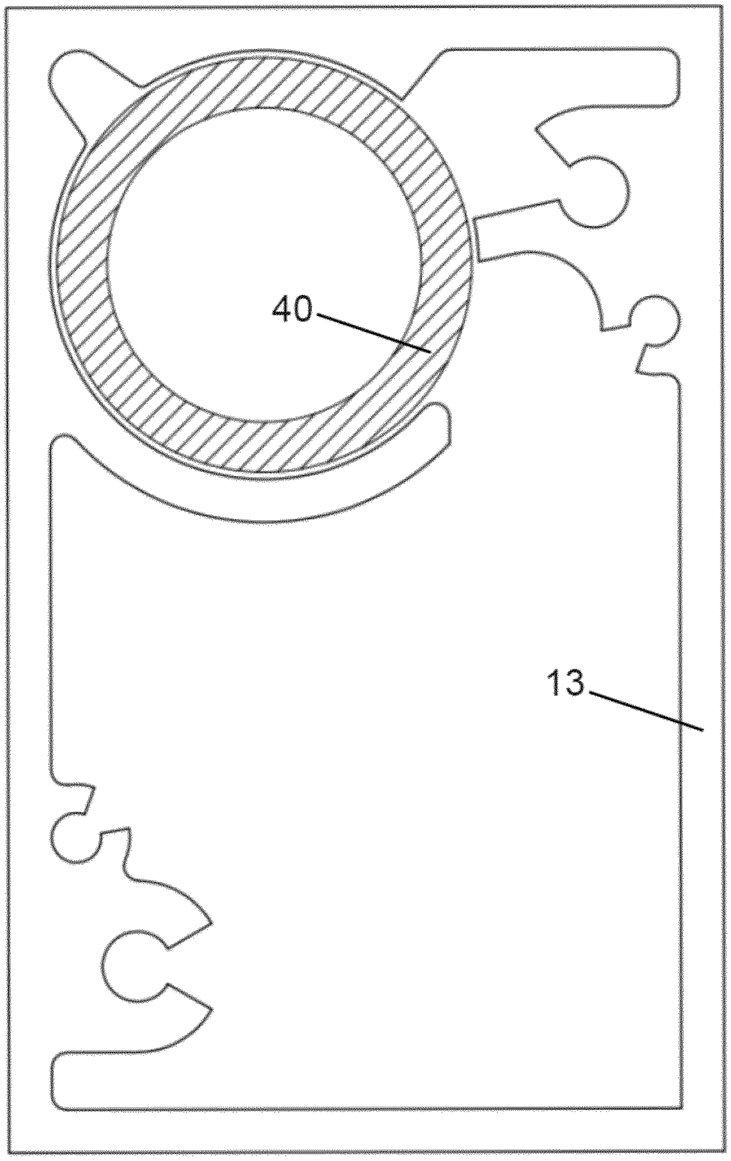
FIG. 8 schematically illustrates a plan view of a beam of a leaf according to an example.

FIG. 1 schematically illustrates a perspective view of a folding shutter system according to an example of the present disclosure. The folding shutter system 1 includes a first leaf 10 to be hingedly connected to a building structure 100. The first leaf 10 may be connected to the building structure 100 through a vertical shaft 40 as seen in FIG. 3 or 8. Following with FIG. 1, the first leaf 10 is hingedly connected to a second leaf 20. The system 1 also includes a driving hinge mechanism that includes a tubular body 30 longitudinally arranged between the two leaves 10, 20. The tubular body 30 may be generally cylindrical shaped. The tubular body 30 may be arranged along at least a portion of the length of the leaves.

The two leaves 10, 20 are rotatably displaceable relative to each other about a longitudinal axis LA of the tubular body 30, such that at least a folded position and an expanded position of the leaves 10, 20 are defined. The folded position may be seen in FIGS. 2 and 4, and the expanded position may be seen in FIGS. 3 and 5. FIG. 1 illustrates an example of the system 1 in an intermediate position, i.e. a position in the way from the expanded to the folded position or vice versa. The intermediate position may be a V-position and may be chosen or determined by the user.

Figure 10:
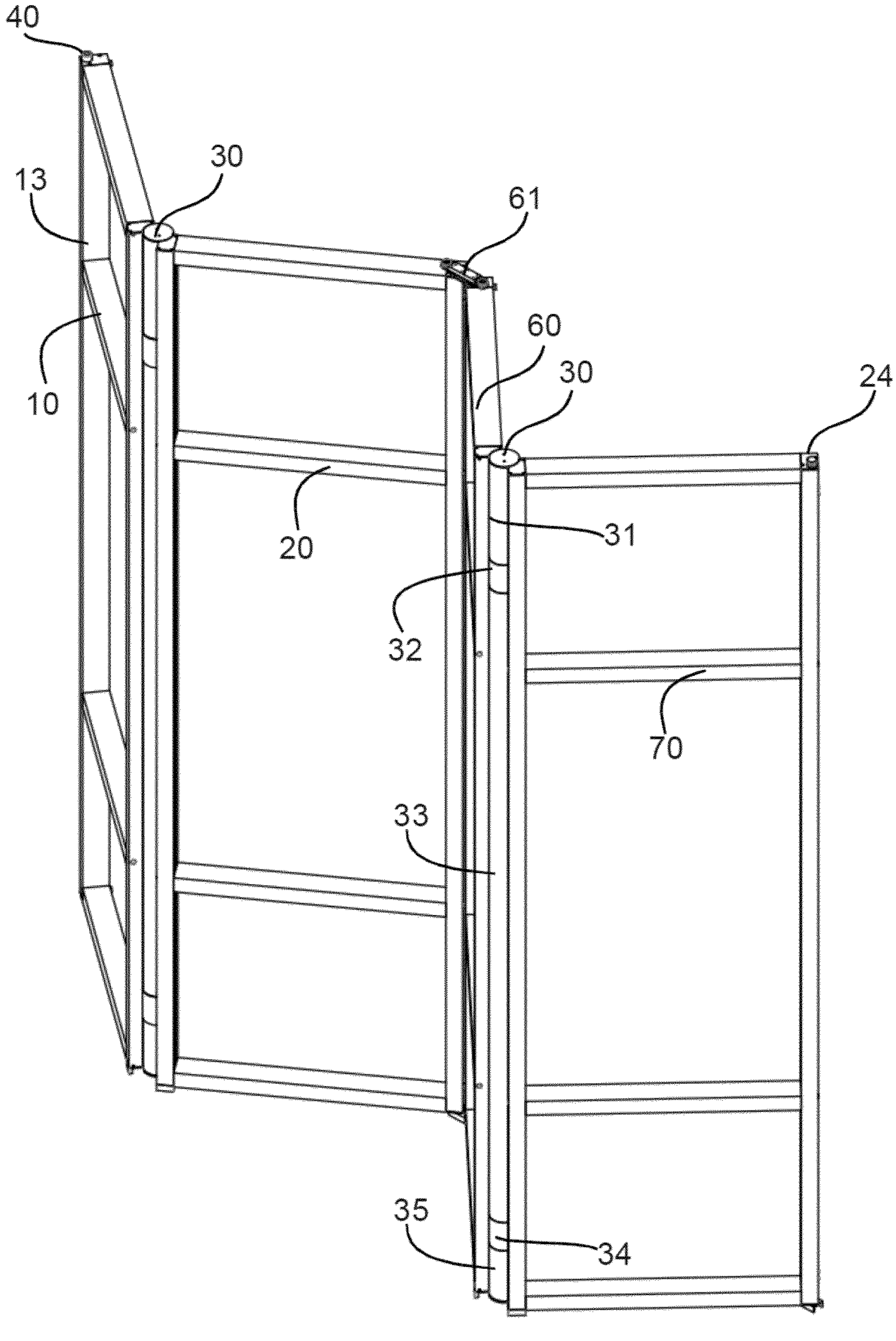
FIG. 10 schematically illustrates a perspective view of the folding shutter system of the FIG. 9 in a partially folded position.
Figure 11:
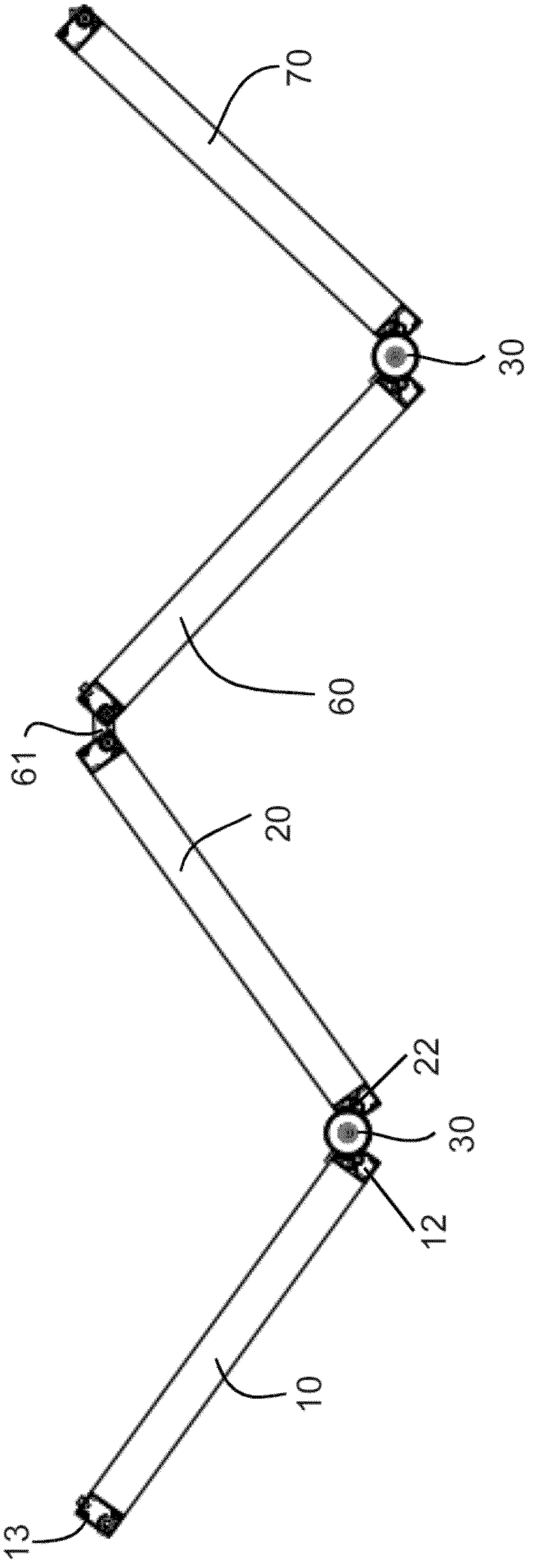
FIG. 11 schematically illustrates a plan view of the shutter system of FIG. 10.
Figure 12:
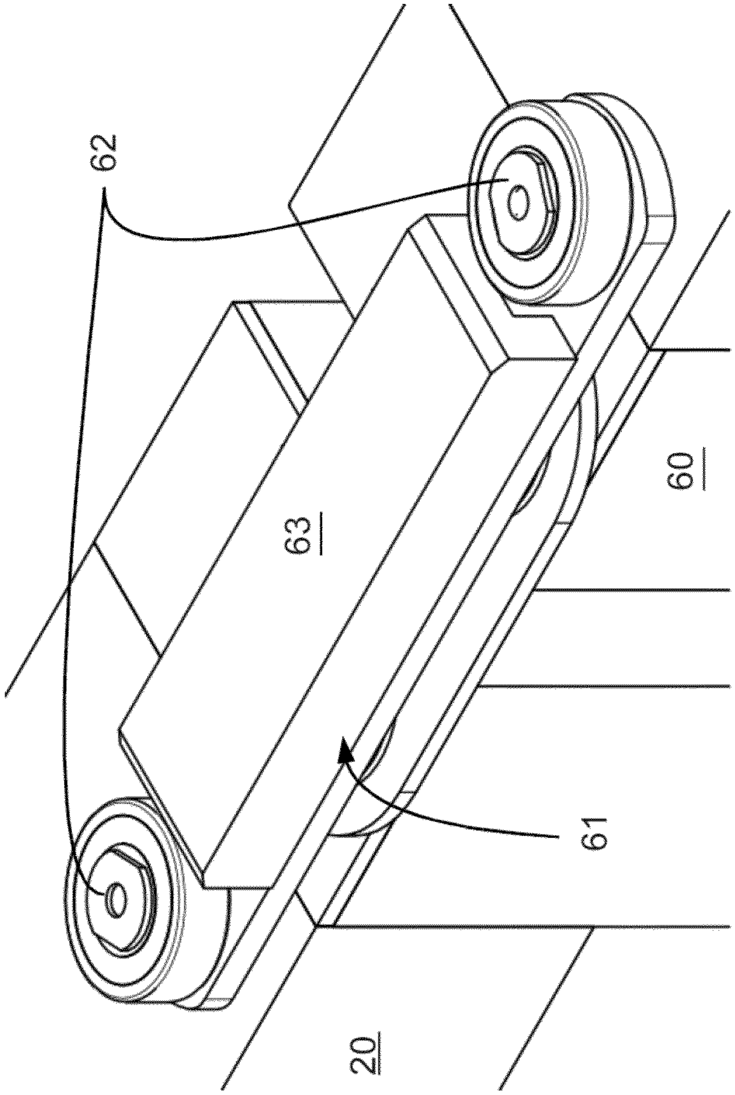
FIG. 12 schematically illustrates partial view of a pair of leaves joined through a bridge according to an example of the present disclosure.

In some examples, the second leaf 20 may be connected to a third leaf 60 in such a way that the first, second and third leaves 10, 20, 60 may form a zigzag in a folded position or at least partially folded position, as seen from above in FIGS. 10, 11. The second and the third leaves 20, 60 may be joined together through a bridge 61, e.g. a bridge at the top of the leaves 20, 60 or two bridges 61, one at each of the top and bottom of the leaves 20, 60. FIG. 12 schematically illustrates a bridge 61 according to an example. The bridge 61 may be substantially planar and elongate, e.g. a plate. Each of the second and the third leaves may be rotatably connected to the bridge 61. The bridge 61 may be guided by a guiding rail 50 connected to the building. The bridge 61 may have a bridge guiding member 62, 63 to be guided through the guiding rail 50. Details about the guiding rail 50 are provided later on. The bridge guiding member 62, 63 may be guided when the leaves rotate relative to each other driven by the driving hinge mechanism or manually driven. In the examples of FIG. 12, the bridge guiding member 62, 63 includes an elongated pad 62 between a pair of bearings to slide through the guiding rail 50. The number and type of bridge guiding members may vary depending on the case.

Figure 9:
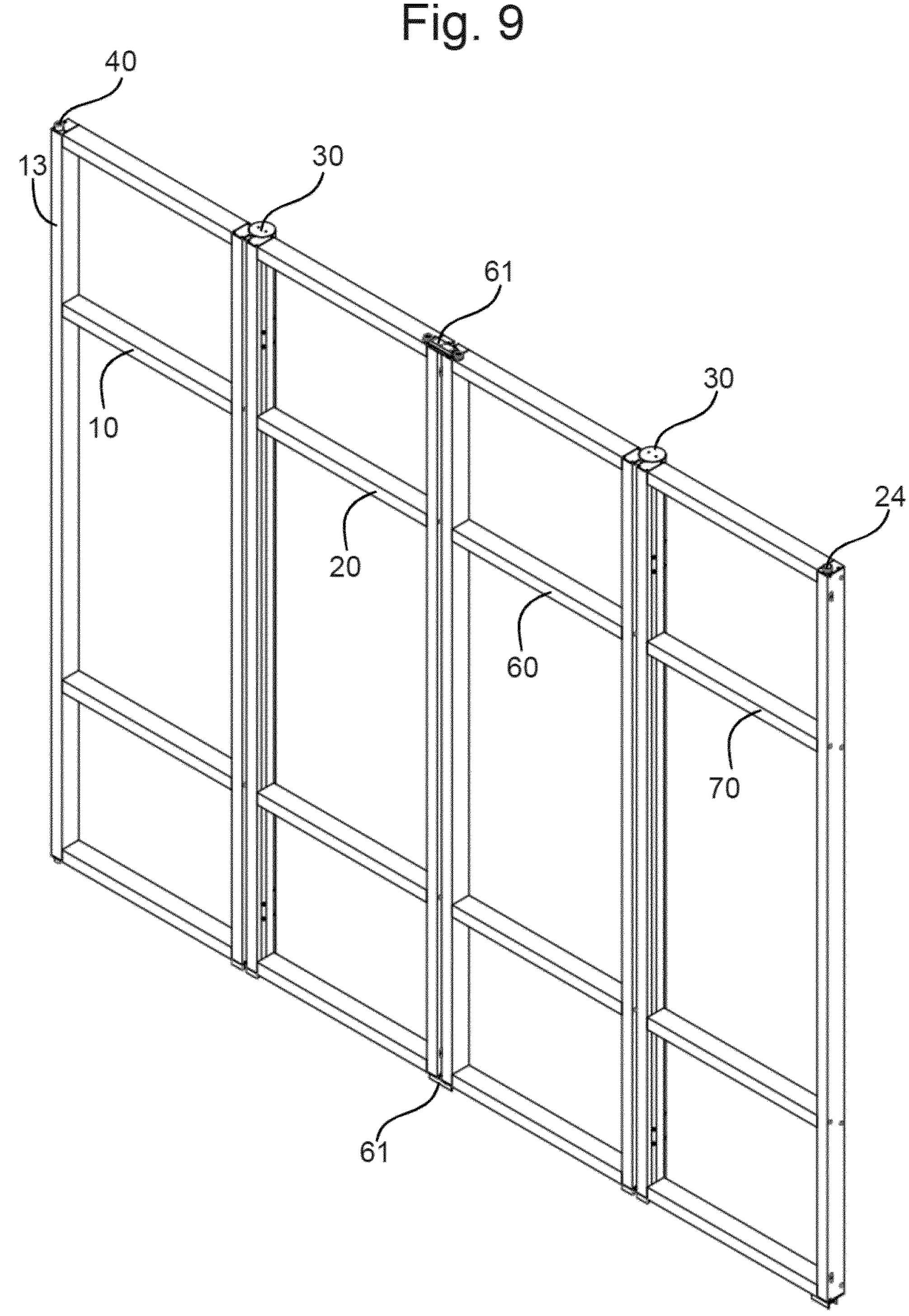
FIG. 9 schematically illustrates a perspective view of a folding shutter system according to an example of the present disclosure in an extended position.

If the shutter system 1 has a fourth leaf 70 as seen in the example of FIGS. 9-11, the third leaf 60 and the fourth leaf 70 may be joined together through a driving hinge mechanism as herein disclosed, i.e. the same way as the first leaf 10 and the second leaf 20 are joined together. Thus, the third and fourth leaves 60, 70 may have profiles to join the tubular body 30.

The shutter system 1 may have a plurality of leaves that may be joined together by the driving hinge mechanism and the bridge alternately between them. For example, a first pair of leaves 10, 20 may be joined through the hinge mechanism, a second pair of leaves 20, 60 through the bridge 61 and a third pair of leaves 60, 70 through the driving hinge mechanism as herein disclosed.

Figure 2:
FIG. 2 schematically illustrates a plan view of the folding shutter system of FIG. 1 in a folded position.

An example of a shutter system 1 in which two pairs of leaves are arranged on the same side of the window 101 in the folded position is shown in the attached FIG. 2. To achieve this arrangement, a driving hinge mechanism may be placed between the third and fourth leaves, as described above. However, each of the two pairs may be arranged on both sides of the window in the folded position. In the latter case, the first leaves of each pair are hinged to the building structure.

The leaves 10, 20 have a cross-sectional outline having a beveled edge 21, 11. The beveled edges 21, 11 are configured so as to define a cavity C for housing or receiving at least partially the cross-sectional outline of the tubular body 30 in the expanded position and/or the folded position. The cavity C may be defined in an intermediate position of the leaves as well.

The cavity C can be seen in FIGS. 2 and 3. In FIG. 3 the separation distance or gap between the leaves 10, 20 has been enlarged for the sake of clarity. In some examples, the tubular body is substantially hidden behind the leaves 10, 20 when looking at the building facade. In FIG. 6 a cavity C has been referenced, i.e. a partial cavity. However, the whole cavity C as per FIGS. 2 and 3 is obtained by the cooperation of the beveled edges of both leaves 10, 20.

In some examples, the beveled edge 21, 11 and the cross-sectional outline of the tubular body 30 may have cooperating shapes with each other. This way, the beveled edges 21, 11 and the tubular body 30 may be attached to each other, for instance the beveled edge 21, 11 and the tubular body 30 may be detachably joined. According to some examples of the shutter system 1, the beveled edge 21, 11 and the tubular body 30 may be detachably joined through a dovetail joint defined along the longitudinal axis LA. The dovetail joint may be present in one section or in several sections between the tubular body 30 and the leaf 10, 20.

In the examples of FIGS. 6 and 7, a cross-section view of an extruded profile 22 of a leaf 20 and the cross-section view of a tubular body 30 of a folding shutter system 1 according to an example are shown. When the leaf 20 has a profile 22, the profile 22 may have a dovetail slot 221 to receive a dovetail 311 protruding from the cross-sectional outline of the tubular body 30. The dovetail 311 may be a longitudinal protrusion with a cross-sectional outline shaped to substantially fit the dovetail slot 221. If the leaf 20 is not provided with a profile 22, the leaf 20 itself may have the dovetail slot 221. Details about the profile 22 are provided later on.

The dovetail joint may allow the tubular body 30 or a part thereof to be detached from the leaf 10, 20 when the tubular body 30 and the leaf are displaced relatively to each other in the direction of the longitudinal axis. Screws or any fasteners (not illustrated) may be provided to hold the tubular body 30 and the leaf 10, 20 in position together. By way of example, a screw may pass through a bore in a securing wall 23 to fasten the profile 12, 22, and so the leaf, to the tubular body 30. The tubular body 30 may receive a shank of the screw. The securing wall 23 may be disposed so as to form a longitudinal indentation along the profile 12, 22.

Although the example of the dovetail slot 221 provided in the leaf 10, 20 or the profile has been explained, the dovetail slot 221 may be disposed in the tubular body 30 and the protrusion of the dovetail 311 in the leaf 10, 20 or the profile 22.

In examples of the system 1, the beveled edge 21, 11 may be rounded, i.e. the beveled edge may be rounded in a cross-sectional view. This way, the rounded beveled edge may be better adapted to the outer contour or outline of a generally cylindrical tubular body 30, particularly the outline of the rounded side face of the cylindrical tubular body.

Although the examples of the attached figures refer to the example of a rounded cross-sectional beveled edge, the beveled edge 21, 11 may adopt any suitable shape such as substantially flat.

According to some examples, a filling of the leaf 10, 20, 60, 70 may be made of wood, metal, plastic, fabric or any suitable material. In some figures such as FIGS. 9 and 10, leaves are illustrated without filling for the sake of clarity. Frames of the leaves can be seen. Frames may include, inter alia, profiles 12, 22, beams 13 and struts to join profiles and beams.

The tubular body 30 may include an actuating module 31 operatively connected to a transmission module 32, wherein the actuating module 31 and the transmission module 32 may be rotatably displaceable relative to each other about the longitudinal axis LA. Each of the actuating module 31 and the transmission module 32 may be respectively joined to the first and second leaves 10, 20.

In examples, the actuating module 31 may be detachably connected to the leaf 10, 20. this may be useful for instance in the event of a malfunction of the actuating module 31.

The attachment of the actuating module 31 and/or the transmission module 32 to the leaf 10, 20 may be performed for example through the dovetail joint explained above. In one example, the actuating module 31 may be attached to the first leaf 10 and the transmission module 32 may be attached to the second leaf 20.

The operative connection between the actuating module 31 and the transmission module 32 may include a tongue and groove joint in which a protruding element may fit substantially into a cooperating opening. The protruding element may have a geometrical shape allowing a torque to be transmitted around the longitudinal axis LA and from the actuating module 31 to the transmission module 32. The geometrical shape may include a polygonal cross-sectional outline. Operation of the actuating module 31 may cause relative rotation between the actuating module 31 and the transmission module 32 about the longitudinal axis LA.

The actuating module 31 may be disposed at one end of the tubular body 30. This may help to disengage the actuating module 31 from the leaf 10, 20. The user may easily access the actuating module 31 without having to disassemble the rest of the tubular body 30.

In examples, the actuating module 31 may have an electric motor 313 connected with the transmission module 32. The electric motor 313 may have a stator and a rotor (not shown). The stator may be associated with the actuating module 31 and the rotor may be associated with the transmission module 32, thereby providing relative rotation about the longitudinal axis LA. The rotation axis of the electric motor may be arranged along the longitudinal axis LA. In some examples, the stator may be associated with the transmission module 32 and the rotor may be associated with the actuating module 31. In some examples, the actuating module 31 has a built-in gear motor inside its hollow core.

As can be seen in FIG. 1, the actuating module 31 and the transmission module 32 may be arranged along the longitudinal axis LA of the tubular body 30. The actuating module 31 and the transmission module 32 may be generally cylindrical shaped, like the tubular body 30.

According to some examples, the leaves 10, 20 may include an extruded profile or profile 12, 22 adjacent to the tubular body 30. The profile 12, 22 may be made of metal such as aluminum or synthetic material such as PVC. In this example, the profile 12, 22 may have the beveled edge 21, 11.

The profile 12, 22 may have a longitudinal recess 222 to receive a power wire 223 to feed the actuating module 31, see for instance FIG. 6. In some examples, the power wire 223 may be to feed the transmission module 31. The power wire 223 may power the electric motor 313. The tubular body 30 may have a hole (not illustrated) to pass through the power wire 223. The hole may be arranged at the side face of the tubular body 30. The tubular body 30 may be in electrical communication with the electric motor 313.

The tubular body 30 may have a generally hollow configuration. This way, the power wire 223 may run through an inner space that may be defined by the modules or segments of the tubular body 30. The modules may have a kind of opening at both ends to allow the power wire 223 to pass through. The power wire 223 may be arranged along a portion of the inner space to feed some electrical devices as will be detailed later on.

In examples, the tubular body 30 may have a locking module 35 to lock the leaves 10, 20 with respect to the building structure 100. The locking module 35 may include a locking pin 351 movable along the longitudinal axis LA between a retracted position in which relative displacement between the leaves 10, 20 and the building structure 100 may be allowed, and an extended position in which the leaves 10, 20 may be fixed with respect to the building structure 100. The locking pin 351 may be actuated through an electrical actuator, e.g. a screw spindle driven by an electric motor. The electrical actuator may be fed by the power wire 223 installed in the inner space of the tubular body 30 as described above.

The locking module 35 may be detachably connected to a leaf 10, 20, for instance, through a dovetail joint as herein disclosed. Furthermore, the locking module 35 may be disposed at one end of the tubular body 30 opposite to the actuating module 31. The user may remove both the locking module 35 and the actuating module 31 in the event of breakdown.

Figure 4:
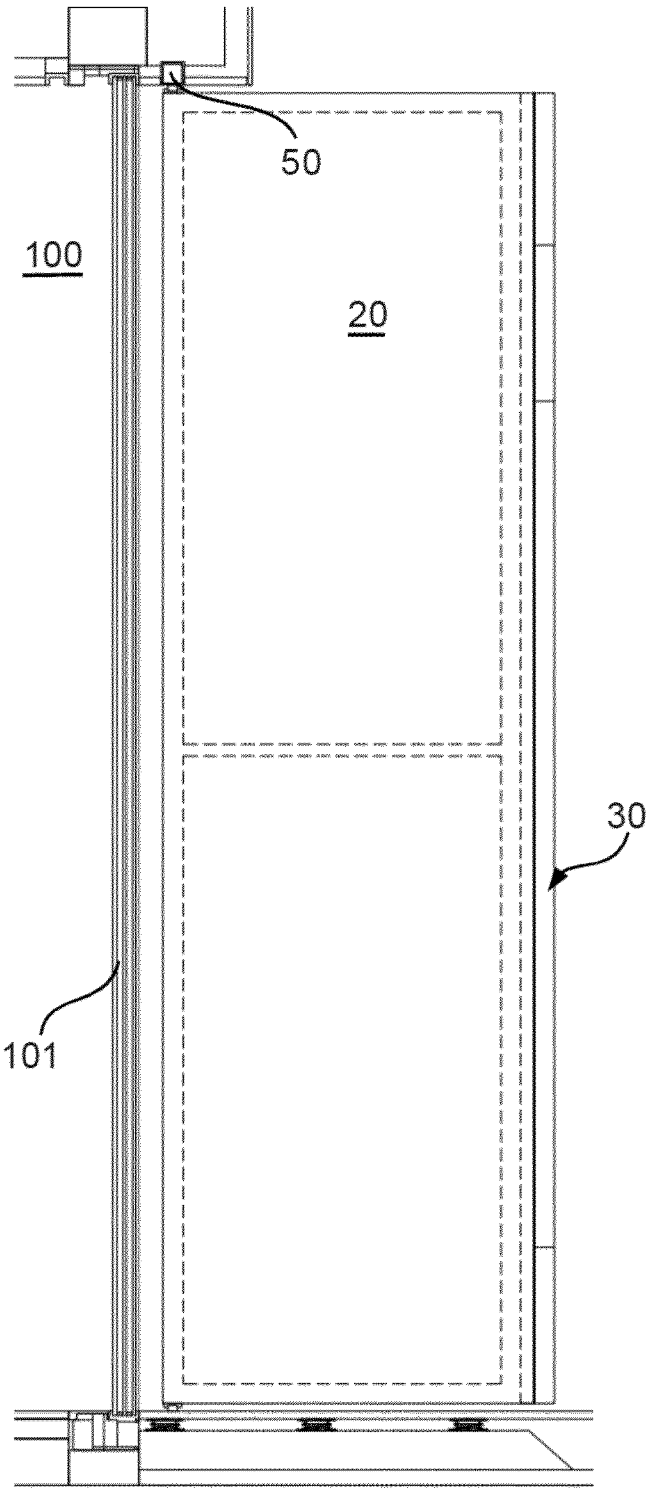
FIG. 4 schematically illustrates a side view of the folding shutter system of FIG. 1 in a folded position.
Figure 5:
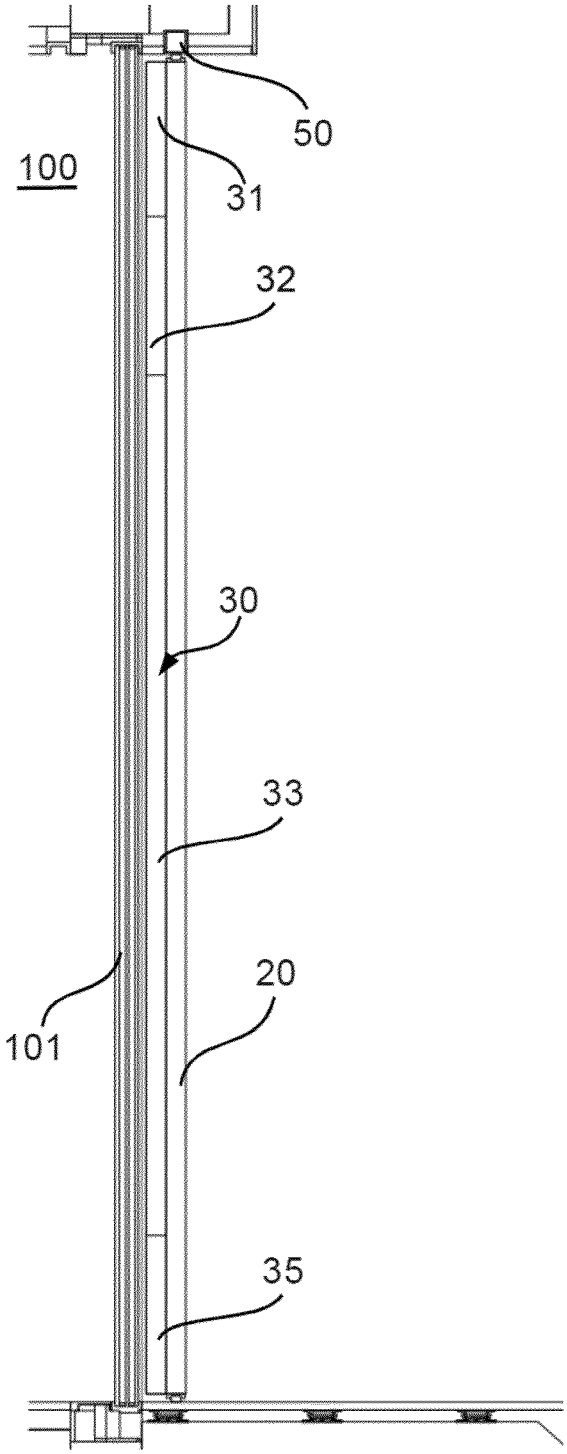
FIG. 5 schematically illustrates a side view of the folding shutter system of FIG. 3 in an extended position.

According to examples, the system may include a guiding rail 50 to be fixed to the building structure 100, see for instance FIGS. 4 and 5. The shutter system 1 may have two guiding rails 50, one above the leaves and another below the leaves. The second leaf 20 may have a projection or glider 24 to follow the guiding rail when the leaves 10, 20 are rotatably displaced from each other, see for instance FIG. 1. In some examples, the glide 24 to follow the guiding rail 50 may be placed in the most remote leaf of the shutter system 1 with respect to the hinged joint to the building. In examples, the second leaf 20 may have a carriage displaceably supported in the guiding rail 50.

In the example of FIG. 1, the guiding rail 50 is place above the leaves. However, the guiding rail may be place at different location, for instance below the leaves.

In some examples, the locking pin 351 may be actuated to interact with the guiding rail 50. The locking pin 351 may act as an anchor to prevent relative motion of the leaves 10, 20 to the building.

In examples, the locking module 35 may be associated with a leaf and the locking pin 351 may be actuated to engage another module attached to the other leaf. This way relative motion of the leaves 10, 20 to each other may be prevented. The locking pin 351 may be arranged in different ways to engage another module. For instance, the locking pin 351 may be actuated along a direction substantially parallel to the longitudinal axial LA. In examples, the locking pin 351 may be actuated along a direction of the longitudinal axis LA if the cross-sectional outline of the pin presents a shape substantially other than a circumference.

The actuating module 31 may receive a control unit 312. The control unit 312 may control the operation of the actuating module 31, e.g. controlling operation of the electric motor 313. A cable for data communication with the control unit 312 may be installed through the recess 222, for instance from a switch or the like to be actuated by the user. The control unit may also control the actuation of the locking pin 351.

In the example of FIG. 1 it can be seen that the tubular body 30 includes the actuating module 31, the transmission module 32, a central portion 33 and the locking module 35. The central portion 33 may be hollow and attached to the same leaf 10, 20 as the actuating module 31. The transmission module 32 may be attached to a different leaf 10, 20 from the central portion 33. This way, if it is necessary to remove the actuating module 31 and/or the locking module 35, the system 1 may be folded and unfolded manually.

The tubular body 30 may include a connecting module 34 that may be rotatably arranged between the central portion 33 and the locking module 35 as seen in FIG. 10. The connecting module 34 may be attached to the same leaf as the transmission module 32.

The different modules of the system 1 may be rotatably displaceable relative to each other. The modules of the system 1 may present hollow inner rooms, i.e. a tubular configuration.

FIG. 8 shows the cross section of a beam 13, for example an extruded beam 13 in which a vertical shaft 40 may be housed. The vertical shaft 40 may be a hollow shaft, e.g. tubular configuration. The vertical shaft may be linked by its end or ends to the building 100, for instance to the top and/or to the bottom of the window 101. The beam 13 may rotate about the vertical shaft, and thus the first leaf 10 may also rotate about the vertical shaft.

In some examples, the shutter system 100 may include electrical wiring such as the power wire 223 to electrically power components of the shutter system 100 such as the electric motor 313 or the locking pin 351. An electrically conductive cable e.g. the power wire 223 may be connected to the building electrical grid (not illustrated). The power wire 223 may enter a hollow space inside the vertical shaft 40. From the vertical shaft, the power wire 223 may enter the first leaf through the beam 13, for instance through a bore or the like in the vertical shaft 40 and the beam 13. The power wire 223 may then reach the opposite side of the first leaf 10 through the top of the first leaf 10. If the profile 12, 22 is on the opposite side, the power wire 223 may descend through the hollow interior of the profile 12, 22, for example through the longitudinal recess 222. From the longitudinal recess 222 current may be transmitted to the electric motor of the actuating module 31 as described above. The power wire 223 may pass either to the transmission module 32 or to the central portion 33, depending on which part of the tubular body 30 is connected to the first leaf 10. From there it may descend through the hollow center of the central portion 33. If the system 1 has a locking module 35, it may also be powered by the power wire 223 through the hollow center of the tubular body 30.

In the case of having to feed a driving hinge mechanism of a further leaf beyond the second leaf 20, the power wire 223 may exit from the central portion 33, depending on which of these parts is connected to the further leaf. A communication wire (not illustrated) may be arranged parallel to the power wire 223, so the communication wire may follow a similar path to the power wire 223.

Due to the hollow interior of the vertical shaft 40 and the tubular body 30, power and/or data can be transmitted between the building and the leaves and between the leaves without shearing of the wires such as the power wire 223.

In the following, an example of operation of the system 1 as disclosed herein is described. If starting from an extended position, as for example illustrated in FIGS. 4 and 5, the leaves 10, 20 may be substantially parallel to the building or at least the windows 101. The user may operate a switch or the like in data and/or electrical communication with the module housing the electric motor 313, for example the actuating module 31. The electric motor 313 may then be activated and cause a relative rotation between the actuation module 31 and the transmission module 32 and thus relative movement between the two mutually folding leaves 10, 20. The relative movement may end when the system 1 reaches the folded position as shown in FIGS. 2 and 4. As the electric motor 313 is actuated, the glider 24 may be guided by the guiding rail 50 so as to guide the folding or unfolding operation of the shutter.

If the shutter system 1 has a third leaf 60, the bridge guiding member 62 may move guided by the guiding rail 50. The relative movement of the leaves 10, 20 as described above may cause the bridge guiding member 62 to move relative to the guiding rail 50 away or towards the vertical shaft 40.

The operation of the shutter system 1 with various driving hinge mechanisms may be the same as above described, mutatis mutandis. Electric motors of different hinge mechanisms may be activated according to a predefined order. The electric motors of different hinge mechanisms may be operated under different parameters depending on the needs, for instance, torque and/or angular speed and/or duration and/or angular direction and/or angular span according to predefined parameters. Each pair of leaves joined through a driving hinge mechanism may be activated at a predefined moment or with a predefined speed, duration, direction or span. This way, the leaves may be folded or unfolded following a predefined sequence and/or with a predefined speed and/or under a predefined angular path. Furthermore, only some leaves of the shutter system 1 may be folded or unfolded, i.e. the operation of the shutter system 1 may be limited to a number of leaves, lower than the overall amount of the drivable pair of leaves.

Parameters may be entered by the user through a user interface in data communication with the control unit 312.

For reasons of completeness, various aspects of the present disclosure are set out in the following numbered clauses:

Clause 1. A folding shutter system comprising:

a first leaf to be hingedly connected to a building structure, wherein the first leaf is hingedly connected to a second leaf;

a driving hinge mechanism comprising a tubular body longitudinally arranged between the two leaves, wherein the two leaves are rotatably displaceable relative to each other about a longitudinal axis of the tubular body, such that at least a folded position and an expanded position of the leaves are defined;

wherein the leaves have a cross-sectional outline having a beveled edge, the beveled edges being arranged so as to define a cavity for housing at least partially the cross-sectional outline of the tubular body.

Clause 2. The system according to clause 1, wherein the beveled edge and the cross-sectional outline of the tubular body have cooperating shapes with each other.

Clause 3. The system according to any of clauses 1-2, wherein the beveled edge is rounded.

Clause 4. The system according to any of clauses 1-3, wherein the beveled edge and the tubular body are detachably joined through a dovetail joint defined along the longitudinal axis.

Clause 5. The system according to clause 4, wherein the leaf has a dovetail slot to receive a dovetail protruding from the cross-sectional outline of the tubular body.

Clause 6. The system according to any of clauses 1-5, wherein the tubular body comprises an actuating module operatively connected to a transmission module, wherein the actuating module and the transmission module are rotatably displaceable relative to each other about the longitudinal axis, and each of the actuating module and the transmission module are respectively joined to the first and second leaves.

Clause 7. The system according to clause 6, wherein the actuating module is disposed at one end of the tubular body.

Clause 8. The system according to any of clauses 6-7, wherein the actuating module is detachably connected to a leaf.

Clause 9. The system according to any of clauses 6-8, wherein the actuating module has an electric motor connected with the transmission module.

Clause 10. The system according to any of clauses 6-9, wherein the actuating module and the transmission module are arranged along the longitudinal axis of the tubular body.

Clause 11. The system according to any of clauses 1-10, wherein the leaves comprise an extruded profile adjacent to the tubular body.

Clause 12. The system according to clauses 6 and 11, wherein the profile has a longitudinal recess to receive a power wire to feed the actuating module.

Clause 13. The system according to any of clauses 1-12, wherein the tubular body has a locking module to lock the leaves with respect to the building structure.

Clause 14. The system according to clause 13, wherein the locking module comprises a locking pin movable along the longitudinal axis between a retracted position in which relative displacement between the leaves and the building structure is allowed, and an extended position in which the leaves are fixed with respect to the building structure.

Clause 15. The system according to any of clauses 13-14, wherein the locking module is detachably connected to a leaf.

Clause 16. The system according to clauses 7 and 13, wherein the locking module is disposed at one end of the tubular body opposite to the actuating module.

Clause 17. The system according to any of clauses 1-16, comprising a guiding rail to be fixed to the building structure, wherein the second leaf has a projection to follow the guiding rail when the leaves are rotatably displaced from each other.

Clause 18. The system according to any of clauses 1-17, wherein the tubular body is generally cylindrically shaped.

Clause 19. The system according to any of clauses 1-18, wherein the cavity is arranged to face the building structure in the expanded position.

Clause 20. The system according to clause 6, wherein the tubular body has a core to receive a control unit.

Clause 21. The system according to any of clauses 1-19, wherein the second leaf is connected to a third leaf in such a way that the first, second and third leaves form a zigzag in a folded position, wherein the second and the third leaves are joined together through a bridge, each of the second and the third leaves being rotatably connected to the bridge.

Clause 22. The system according to clauses 17 and 21, wherein the bridge has a bridge guiding member to be guided by the guiding rail.

Clause 23. A method of operation of the shutter system according to any of clauses 1-22, comprising activating the driving hinge mechanism under predefined parameters, wherein the parameters are at least one of: angular speed, duration, angular direction, and/or angular span.

Clause 24. The method according to clause 23, wherein the shutter system has various driving hinge mechanisms, and the driving hinge mechanisms are activated in a predefined order.

Clause 25. The method according to clause 23, wherein the shutter system has various driving hinge mechanisms, and the parameters for activating at least two driving hinge mechanisms are different from each other.

Clause 26. The method according to clause 23, wherein the shutter system has various driving hinge mechanisms, and at least one driving hinge mechanism is activated.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

The invention claimed is:

1. A folding shutter system comprising:

a first leaf to be hingedly connected to a building structure, the first leaf being hingedly connected to a second leaf;

a driving hinge mechanism comprising a tubular body longitudinally arranged between the first and second leaves, the first and second leaves being rotatably displaceable relative to each other about a longitudinal axis of the tubular body, defining at least a folded position and an expanded position of the first and second leaves being defined thereby;

the first and second leaves each having a cross-sectional outline each cross-sectional outline having a beveled edge, the beveled edges of each cross-sectional outline of each of the first and second leaves being arranged to define a cavity for housing at least partially a tubular body cross-sectional outline of the tubular body;

the tubular body comprising an actuating module operatively connected to a transmission module, the actuating module and the transmission module being rotatably displaceable relative to each other about the longitudinal axis, and each of the actuating module and the transmission module being respectively joined to the first and second leaves.

2. The system according to claim 1, each of the beveled edges and the cross-sectional outline of the tubular body having cooperating shapes with each other.

3. The system according to claim 1, each of the beveled edges and the tubular body being detachably joined through a dovetail joint defined along the longitudinal axis.

4. The system according to claim 1, the actuating module being disposed at one end of the tubular body.

5. The system according to claim 1, the actuating module having an electric motor connected with the transmission module.

6. The system according to claim 1, the leaves comprising an extruded profile adjacent to the tubular body.

7. The system according to claim 6, the profile having a longitudinal recess to receive a power wire to feed the actuating module.

8. The system according to claim 1, the tubular body having a locking module to lock the leaves with respect to the building structure.

9. The system according to claim 8, the locking module comprising a locking pin movable along the longitudinal axis between a retracted position allowing relative displacement between the leaves and the building structure, and an extended position fixing disposition of the leaves with respect to the building structure.

10. The system according to claim 8, the locking module being detachably connected to at least one of the first and second leaves.

11. The system according to claim 1, the actuating module being detachably connected to at least one of the first and second leaves.

12. The system according to claim 1, comprising a guiding rail to be fixed to the building structure, the second leaf having a projection to follow the guiding rail when the leaves are rotatably displaced from each other.

13. The system according to claim 1, the cavity being arranged to face the building structure in the expanded position.

14. The system according to claim 1, the second leaf being connected to a third leaf in such a way that the first, second and third leaves form a zigzag in a folded position, the second and the third leaves being joined together through a bridge, each of the second and the third leaves being rotatably connected to the bridge.

15. A method of operation of a shutter system comprising:

a first leaf to be hingedly connected to a building structure, the first leaf being hingedly connected to a second leaf;

a driving hinge mechanism comprising a tubular body longitudinally arranged between the first and second leaves, the first and second leaves being rotatably displaceable relative to each other about a longitudinal axis of the tubular body, defining at least a folded position and an expanded position of the first and second leaves;

the first and second leaves each having a cross-sectional outline each cross-sectional outline having a beveled edge, the beveled edges of each cross-sectional outline of each of the first and second leaves being arranged to define a cavity for housing at least partially a tubular body cross-sectional outline of the tubular body;

the tubular body comprising an actuating module operatively connected to a transmission module, the actuating module and the transmission module being rotatably displaceable relative to each other about the longitudinal axis, and each of the actuating module and the transmission module being respectively joined to the first and second leaves;

the method comprising:

activating the driving hinge mechanism under predefined parameters, the parameters being at least one of: angular speed, duration, angular direction, and/or angular span.

16. The method according to claim 15, the shutter system having various driving hinge mechanisms, and the parameters for activating at least two driving hinge mechanisms being different from each other.

17. The method according to claim 15, the shutter system having various driving hinge mechanisms, and the driving hinge mechanisms being activated in a predefined order.

18. The method according to claim 15, the shutter system having various driving hinge mechanisms, and at least one driving hinge mechanism being activated.

19. A folding shutter system comprising:

a first leaf to be hingedly connected to a building structure, the first leaf being hingedly connected to a second leaf;

a driving hinge mechanism comprising a tubular body longitudinally arranged between the first and second leaves, the first and second leaves being rotatably displaceable relative to each other about a longitudinal axis of the tubular body, defining at least a folded position and an expanded position of the first and second leaves;

the first and second leaves each having a cross-sectional outline each cross-sectional outline having a beveled edge, the beveled edges of each cross-sectional outline of each of the first and second leaves being arranged to define a cavity for housing at least partially a tubular body cross-sectional outline of the tubular body;

the tubular body comprising an actuating module operatively connected to a transmission module, the actuating module and the transmission module being rotatably displaceable relative to each other about the longitudinal axis, and each of the actuating module and the transmission module being respectively joined to the first and second leaves, the actuating module being detachably connected to at least one of the first and second leaves;

the tubular body having the transmission module attached to one of the first and second leaves and a central portion of the tubular body attached to another of the first and second leaves, the central portion and the transmission module being rotatable relative to each other about the longitudinal axis.

* * * * *